United States Patent [19]

Komatsu et al.

[11] Patent Number: 4,739,461
[45] Date of Patent: Apr. 19, 1988

[54] POWER SUPPLY DEVICE FOR PROVIDING POSITIVE AND NEGATIVE DC VOLTAGES ON THE SECONDARY OF A TRANSFORMER

[75] Inventors: Shunichi Komatsu; Koji Suzuki, both of Yokohama, Japan

[73] Assignee: Canon Kabushiki Kaisha, Tokyo, Japan

[21] Appl. No.: 903,373

[22] Filed: Sep. 3, 1986

[30] Foreign Application Priority Data

| Sep. 6, 1985 | [JP] | Japan | 60-195793 |
| Sep. 6, 1985 | [JP] | Japan | 60-195794 |
| Sep. 6, 1985 | [JP] | Japan | 60-195795 |
| Sep. 6, 1985 | [JP] | Japan | 60-195796 |
| Sep. 6, 1985 | [JP] | Japan | 60-195797 |
| Sep. 6, 1985 | [JP] | Japan | 60-195798 |

[51] Int. Cl.$^4$ .................................... H02M 3/335
[52] U.S. Cl. .................................... 363/20; 307/138; 363/24
[58] Field of Search ............ 307/132 R, 138; 363/20, 363/21, 24, 25, 26

[56] References Cited

U.S. PATENT DOCUMENTS

| 3,562,623 | 2/1971 | Farnsworth | 363/20 |
| 3,569,818 | 3/1971 | Dahlinger et al. | 363/21 |
| 4,235,137 | 2/1981 | Rao | 363/21 |
| 4,660,135 | 4/1987 | Lee | 363/21 |

FOREIGN PATENT DOCUMENTS

| 120160 | 10/1978 | Japan | 363/21 |
| 133979 | 10/1981 | Japan | 363/24 |

OTHER PUBLICATIONS

Wyland, "Transformer Isolation Switch", *IBM Tech. Discl. Bul.*, vol. 11, No. 1, pp. 43, 4, Jun. 1968.

*Primary Examiner*—William H. Beha, Jr.

[57] ABSTRACT

A power supply device capable of supplying high DC voltages of positive and negative polarities has a transformer having a primary coil and two secondary coils. A DC current supplied to the primary coil is switched to generate voltages in the secondary coils. These voltages are rectified and smoothed in mutually opposite polarities, and the output voltages are obtained by summing the rectified and smoothed voltages.

6 Claims, 6 Drawing Sheets

POWER SUPPLY DEVICE FOR PROVIDING POSITIVE AND NEGATIVE DC VOLTAGES ON THE SECONDARY OF A TRANSFORMER

BACKGROUND OF THE INVENTION

1. Field of the Invention

The present invention relates to a power supply device, and in particular to a power supply device capable of supplying high DC voltages of positive and negative polarities.

In case of effecting positive and negative image development in a microfilming apparatus, an electronic copying apparatus, a laser beam printer or the like, there are required positive and negative high DC voltages for electrostatic charging.

A conventional power supply device employed for such application has separate power supply circuits for positive and negative voltages, which are suitably switched, for example, with a relay.

Due to the presence of two separate circuits, such a conventional power supply device involves a large number of component parts and is therefore inevitably large. Also, the switching of high output voltages in such conventional device gives rise to significant noise generation.

SUMMARY OF THE INVENTION

In consideration of the foregoing, an object of the present invention is to provide an improved power supply device.

Another object of the present invention is to provide a compact power supply device.

Still another object of the present invention is to provide a power supply device with a reduced number of component parts.

Still another object of the present invention is to provide a power supply device with a reduced manufacturing cost.

Still another object of the present invention is to provide a power supply device capable of preventing noise generation at the switching of output voltages.

The foregoing and still other objects of the present invention will become fully apparent from the following description.

DETAILED DESCRIPTION OF THE PREFERRED EMBODIMENTS

Now the present invention will be clarified in greater detail by embodiments thereof shown in the attached drawings.

Figure 1:
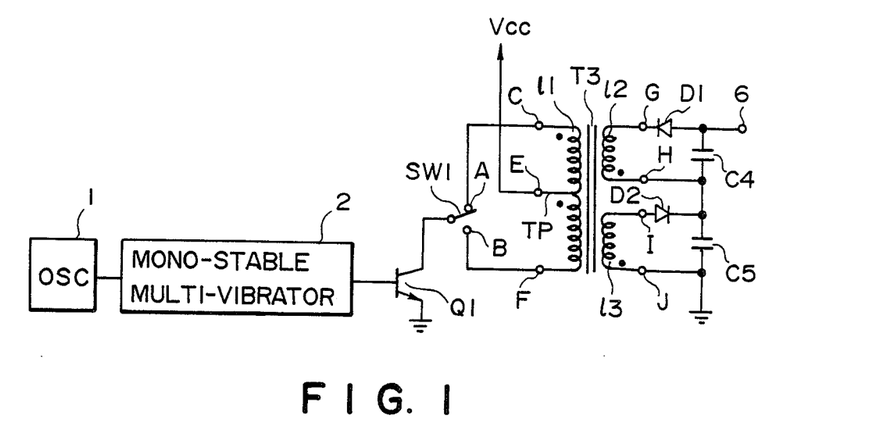
FIG. 1 is a circuit diagram of a power supply device constituting an embodiment of the present invention.

FIG. 1 is a circuit diagram of a power supply device embodying the present invention, wherein a transformer T3 is provided with a primary coil 11 with an intermediate tap, and two secondary coils 12, 13.

The intermediate tap TP of the primary coil 11 receives a positive DC voltage Vcc of a predetermined value from an unrepresented power supply circuit. Both ends C, F of the primary coil are respectively connected to contacts A, B of a selector switch SW1, for example, manually for inverting the polarity of output voltage, further connected, through said selector switch SW1, to the collector of a switching transistor Q1, of which emitter is grounded and of which base is connected to the output of a monostable multivibrator 2. The input terminal thereof is connected the output terminal of an oscillator 1.

Both ends G, H of a first secondary coil 12 of the transformer T3 are connected to a rectifying and smoothing circuit consisting of a serial connection of a diode D1 and a capacitor C4, of which intermediate junction is connected to an output terminal 6 of the power supply device.

Both ends I, J of a second secondary coil 13 are connected to a rectifying and smoothing circuit consisting of a serial connection of a diode D2, of a polarity opposite to that of the above-mentioned diode D1, and a grounded capacitor C5, of which intermediate junction is connected to the junction between the first secondary coil 12 and the capacitor C4.

In this manner the voltages respectively generated in secondary coils 12, 13 are rectified in mutually opposite polarities and smoothed by two rectifying and smoothing circuits, of which outputs are serially combined and supplied to the output terminal 6.

In the following there will be explained the function of the above-described embodiment.

In the operation, the oscillator 1 supplies the monostable multivibrator 2 with clock pulses of a predetermined frequency, with a duty ratio of ca. 0.5.

The monostable multivibrator is triggered by said pulses to supply the base of the transistor Q1 with pulses of a sufficiently small duty ratio, whereby the transistor Q1 is turned on and off to effect a switching operation. The turned-on duration of the transistor Q1 is sufficiently shorter than the turned-off duration thereof.

On the other hand the intermediate tap TP of the primary coil 11 of the transformer T3 receives the DC voltage Vcc, so that a current flows from said intermediate tap to an end C or F of the primary coil according to whether the movable contact of the selector switch SW1 is maintained in contact with terminal A or B. Said current is turned on and off by the switching function of the transistor Q1, thus exciting the transformer T3.

In the following there will be explained an operation in case the selector switch SW1 is shifted to the contact A.

When the transistor Q1 is turned on, a current flows in the primary coil 11 from the terminal E of the intermediate tap to the end terminal C to generate so-called forward voltage E1 of a predetermined value in the secondary coil 13 according to the ratio of numbers of turns of the coils. Specifically, in the secondary coils 12 and 13 the terminals G and I become positive while the terminals H and J become negative, and, because of respective polarities the diode D1 is turned off while the diode D2 is turned on, so that the capacitor C4 does not receive any voltage while the capacitor C5 is charged with the forward voltage E1.

Then, when the transistor Q1 is turned off, the current in the primary coil 11 is interrupted to generate, in the secondary coil 12, a so-called fly-black voltage −E2 of a polarity opposite to that of the forward voltage. In this state the polarities of the terminals G - J are opposite to those when the transistor is turned on to turn on the diode D1 and turn off the diode D2, whereby the flyback voltage −E2 is charged only in the capacitor C4.

The forward voltage E1 charged previously in the capacitor C5 and the flyback voltage −E2 now charge in the capacitor C4 are smoothed by said capacitors, and the sum of said voltages is supplied to the output terminal 6.

The obtained output:

$$\frac{E1 \times T1 - E2 \times T2}{T1 + T2}$$

assumes a predetermined negative value, since the turned-on time of the transistor Q1 is sufficiently shorter than the turned-off time as explained before, so that the generating period of the forward voltage E1 is sufficiently shorter than that of the flyback voltage.

On the other hand, in case the selector switch SW1 is shifted to the contact B, the current in the primary coil 11 flows from the terminal E to the terminal F in an opposite direction compared to the above-explained case, so that the forward and flyback voltages generated in the secondary coils 12, 13 by the on-off operation of the transistor Q1 are respectively −E1 and +E2 of inverted polarities. Thus, through operations inverse to the above-explained case, the capacitor C4 is charged with the forward voltage −E1 while the capacitor C5 is charged with the flyback voltage E2. Through smoothing operations with said capacitors, there is obtained an output:

$$\frac{-E1 \times T1 + E2 \times T2}{T1 + T2}$$

which assumes a predetermined positive value, because of the magnitudes of the voltage-generating periods.

As explained in the foregoing, the present embodiment is provided with a combined structure of a positive power supply circuit and a negative power supply circuit, and allows to obtain positive and negative voltages by inverting, with the selector switch SW1, the direction of a low voltage supplied to the primary coil of the transformer.

In the above-explained structure, it is also possible to connect the unrepresented power supply circuit, for supplying the DC voltage Vcc, to the selector switch SW1 and to connect the collector of the transistor Q1 to the intermediate tap of the primary coil 11.

Figure 2:
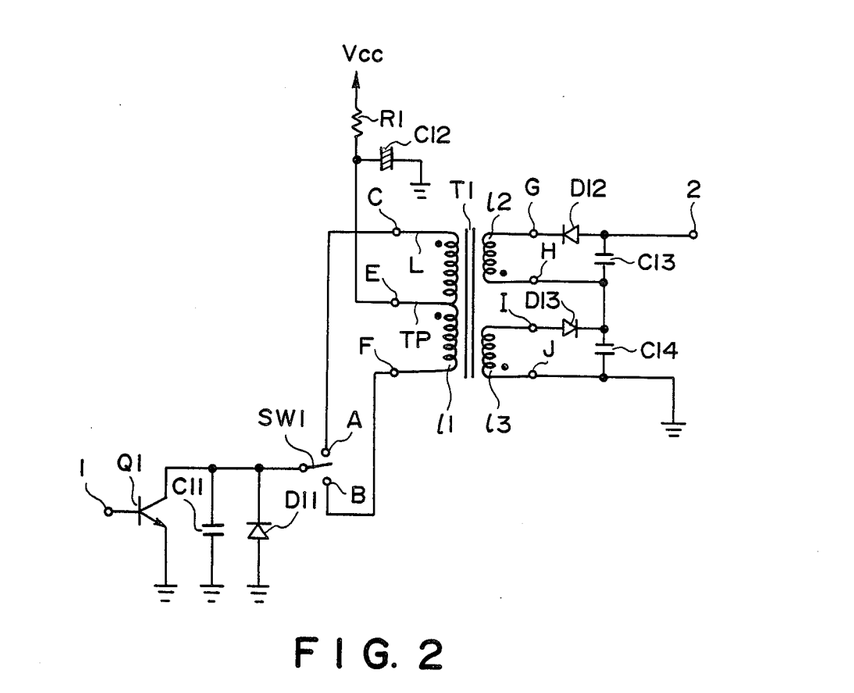
FIG. 2 is a circuit diagram of a power supply device in which a resonance circuit is connected to a switching transistor.

FIG. 2 is a circuit diagram of a power supply device constituting a second embodiment, wherein a resonance capacitor C11 and damper diode D11 are connected in parallel manner between the collector of a transistor Q1 and the ground, whereby a resonance circuit is formed by said capacitor C11 and the inductance of the primary coil 11 between the intermediate tap thereof and either end thereof, when the transistor Q1 is turned off. The remaining parts of the circuit are substantially same as those shown in FIG. 1. C12 indicates a smoothing capacitor.

When the transistor Q1 is turned off, a resonance circuit is formed by the capacitor C11 and the inductance L of the primary coil 11 between the intermediate tap and either end terminal C or F to generate a voltage oscillation, whereby a negative voltage is generated in the inductance L to ensure the above-mentioned turning-off operation and to reduce the switching loss. In this case, besides, a current flows through the diode D11 to improve the efficiency.

Figure 3:
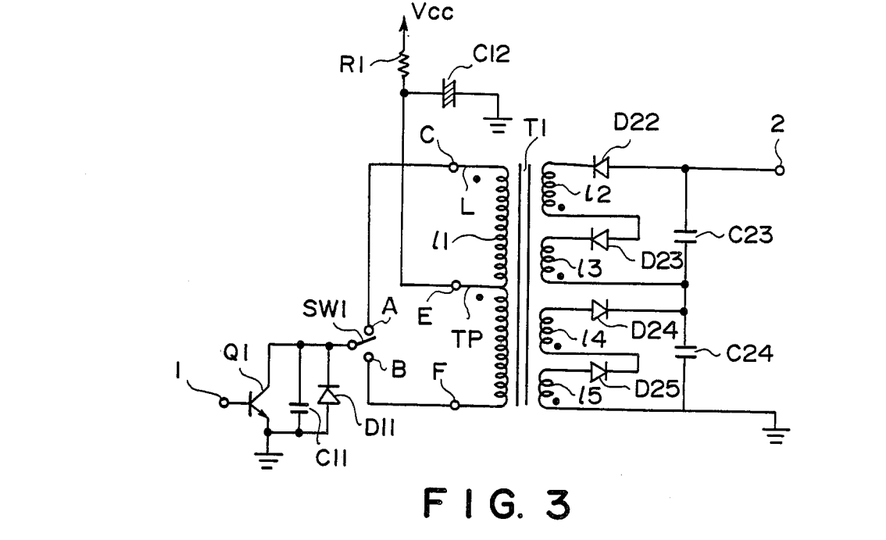
FIG. 3 is a circuit diagram of a power supply device having serially connected two secondary coils in plural sets.

FIG. 3 is a circuit diagram of a power supply device constituting still another embodiment of the present invention, provided with two sets of serial connection of two secondary coils through a diode. The structure of the primary side is same as that shown in FIG. 2.

Secondary coils 12, 13 of a first set of a transformer T1 are serially connected through a diode D3, and are connected, at both ends thereof, to a rectifying and smoothing circuit consisting of a diode D2 of a polarity the same as that of the diode D3 and a capacitor C3, of which intermediate junction is connected to an output terminal 2 of the power supply device.

Secondary coils 14, 15 of a second set are also serially connected through a diode D5 of a polarity opposite to that of the diode D3, and are connected, at both ends thereof, to a rectifying and smoothing circuit consisting of a diode D4 of the same polarity as that of the diode D5 and a grounded capacitor C4, of which intermediate junction is connected to the junction between the secondary coil 13 of the first set and the capacitor C3.

Thus the voltages respectively generated in two sets of secondary coils 12, 13 and 14, 15 are rectified in mutually opposite polarities and smoothed by two rectifying and smoothing circuits, of which outputs are serially combined and supplied to the output terminal 2.

In the operation, as explained before, pulses of a sufficiently small duty ratio are supplied to the base of the transistor Q1 to turn on and off the same, with the turn-on period sufficiently shorter than the turn-off period.

On the other hand, the intermediate tap TP of the primary coil 11 of the transformer T1 receives a DC voltage Vcc smoothed through a resistor R1 and a capacitor C12, and a current flows from said intermediate tap to the end C or F according to whether the selector switch SW1 is shifted to the contact A or B. Said current is turned on and off by the switching function of the transistor Q1 to excite the transformer T1.

When the transistor Q1 is turned off, there is formed, as explained before, a resonance circuit composed of the capacitor C11 and the inductance L of the primary coil 11 between the intermediate tap and the end terminal C or F to generate a voltage resonance, whereby a negative voltage is generated in the inductance L to ensure the above-mentioned turning-off operation and to reduce the switching loss. Besides there is obtained a higher efficiency because a current flows through the diode D11.

In the following there will be explained the operation in case the selector switch SW1 is shifted to the contact A.

When the transistor Q1 is turned on, a current flows in the primary coil 11 from the terminal E of the intermediate tap to the end terminal C to generate so-called forward voltage E1 in the secondary coils 14, 15 according to the ratio of number of turns of the coils.

Because of the difference in polarities of the diodes D22, D23, D24 and D25, the former two are turned off while the latter two are turned on, whereby the forward voltage E1 is not charged in the capacitor C23 but in the capacitor C24.

When the transistor Q1 is then turned off, the current in the primary coil 11 is interrupted to generate, in the secondary coils 12, 13, so-called flyback voltage −E2 of an opposite polarity to that of the forward voltage.

In this state the generated voltage is inverted to turn on the diodes D22, D23 and turn off the diodes D24, D25 whereby the flyback voltage −E2 is charged only in the capacitor C23.

The forward voltage E1 previously charged in the capacitor C24 and the flyback voltage −E2 now charged in the capacitor C23 are smoothed by said capacitors, and the sum of said voltages is supplied to the output terminal 6.

The obtained output voltage:

$$\frac{E1 \times T1 - E2 \times T2}{T1 + T2}$$

assumes a predetermined negative value, since the turn-on period T1 is sufficiently shorter than the turn-off period T2 of the transistor Q1 as explained before, so that the generating period of the forward voltage E1 is sufficiently shorter than that of the flyback voltage E2.

On the other hand, when the selector switch SW1 is shifted to the contact B, the current in the primary coil 11 from the terminal E to the terminal F, namely in a direction opposite to the above-explained case, so that the forward and flyback voltages generated in the secondary coils 12, 13, 14 and 15 by the on-off operation of the transistor Q1 are respectively −E1 and +E2 of inverted polarities. Thus, through operations inverse to the above-explained case, the capacitor C3 is charged with the forward voltage −E1 while the capacitor C4 is charged with the flyback voltage E2. Through smoothing operations with said capacitors, there is obtained an output voltage:

$$\frac{-E1 \times T1 + E2 \times T2}{T1 + T2}$$

which assumes a predetermined positive value, because of magnitudes of voltage-generating periods explained before.

As explained in the foregoing, the present embodiment is provided with a combined structure of a positive power supply circuit and a negative power supply circuit, and permits obtaining positive and negative voltages by inverting, with the selector switch SW1, the direction of a low voltage supplied to the primary coil of the transformer. In the foregoing description each set of secondary coils contains two secondary coils, but it is also possible to include three or more coils in each set.

Figure 4:
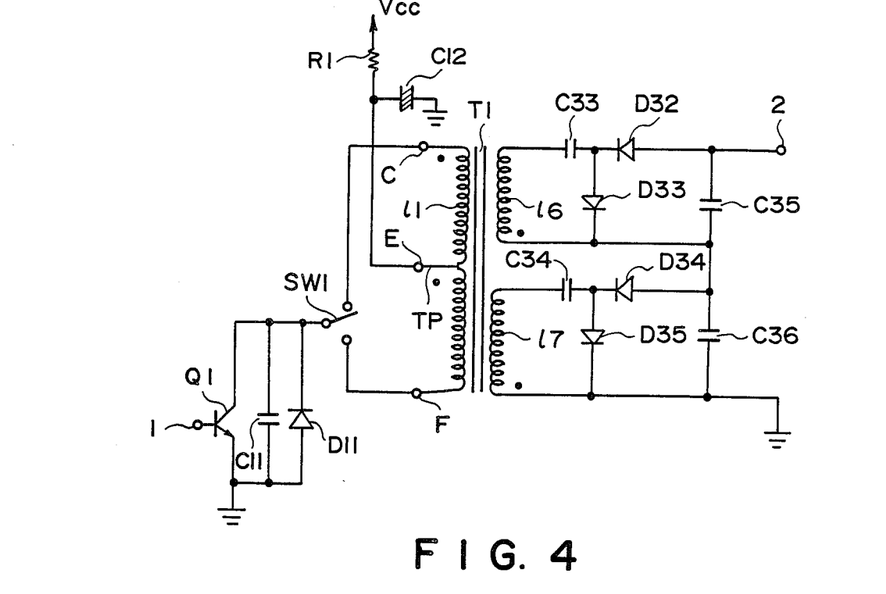
FIG. 4 is a circuit diagram of a power supply device constituting a variation of the circuit shown in FIG. 3.

FIG. 4 is a circuit diagram of a power supply device constituting still another embodiment of the present invention, which is different from the embodiment shown in FIG. 3 in that there are provided two independent secondary coils 16, 17 which are respectively connected to two-stage rectifying-smoothing circuits consisting of diodes D32, D33, capacitors C33, C35, diodes D34, D35 and capacitors C34, C36. The outputs of these circuits are serially combined.

The above-explained circuit performs a same function as that of the embodiment shown in FIG. 3, with same advantages, wherein the secondary coils 16, 17 respectively correspond to the secondary coils 12, 13 and 14, 15 in FIG. 3, and the corresponding two rectifying-smoothing circuits correspond to two circuits shown in FIG. 3. In particular, the present embodiment allows increasing the maximum voltage of the secondary coils 16, 17 due to the presence of the diodes D33, D35 while reducing the number of secondary coils. In the above-explained structure, it is naturally possible to employ three or more stages in each rectifying-smoothing circuit.

Also in the above-explained circuit, it is possible to connect the unrepresented power supply circuit, for supplying the DC voltage Vcc, to the selector switch SW1 and to connect the emitter of the transistor Q1 to the intermediate tap of the primary coil 11.

Figure 5:
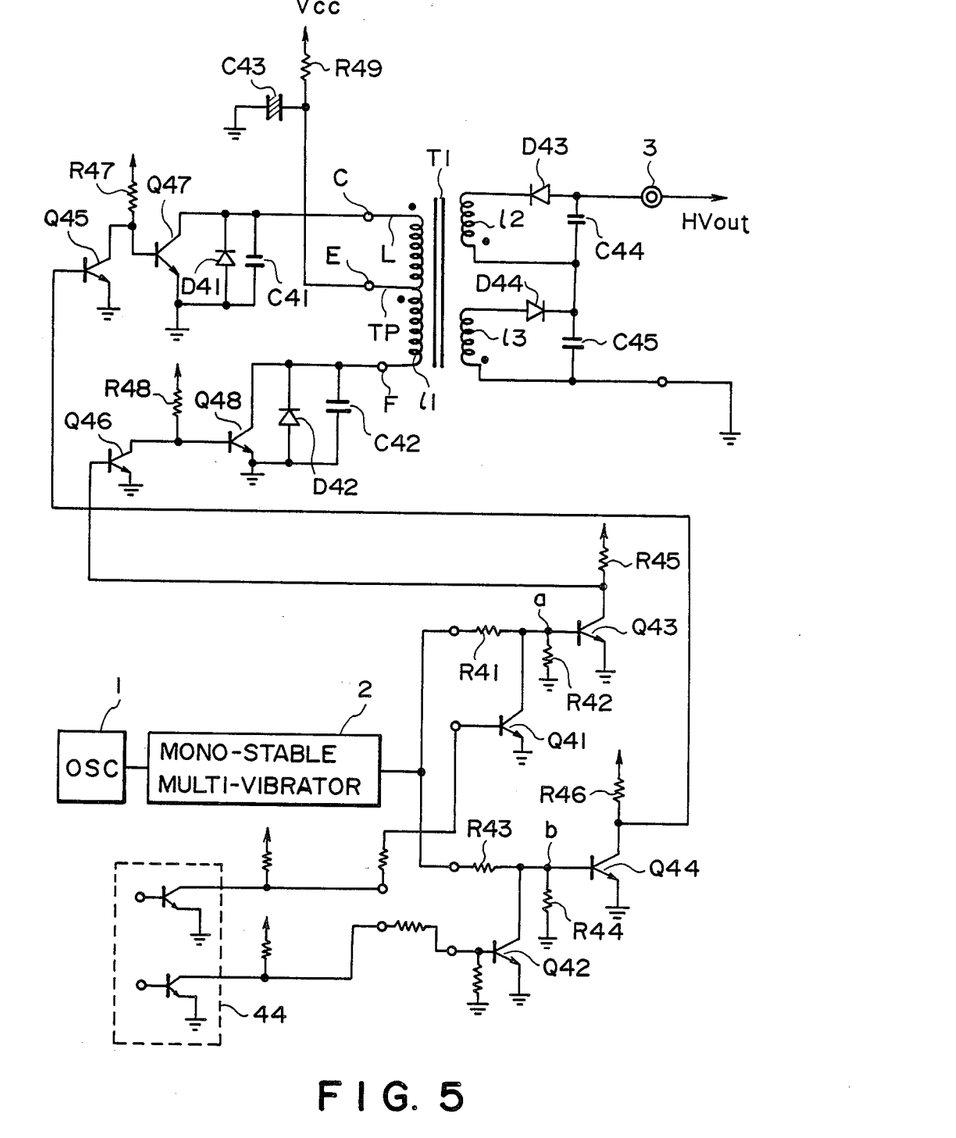
FIG. 5 is a circuit diagram of a power supply device in which a primary coil is switched by an electronic switch.

FIG. 5 is a circuit diagram of a power supply device constituting still another embodiment of the present invention, wherein the primary coil is switched by means of an electronic switch in place of the selector switch SW1.

The intermediate tap TP of the primary coil 11 receives a predetermined positive DC voltage Vcc, supplied from an unrepresented power supply circuit and smoothed by a resistor R49 and a capacitor C43. Both ends C, F of the primary coil 11 are respectively connected to the collectors of switching transistors Q47, Q48 for exciting the transformer T1 by turning on and off said DC voltage supplied to the primary coil through the intermediate tap TP.

The transistors Q47, Q48 are grounded at the emitters thereof, and have resonance capacitors C41, C42 and damper diodes D41, D42 respectively connected in parallel manner between the collectors and the ground.

The base of the transistor Q47 is connected through a two-stage amplifier circuit consisting of a transistor Q45, a resistor R47, a transistor Q44 and resistors R46, R44, R43, while the base of the transistor Q48 is connected through a two-stage amplifier circuit consisting of a transistor Q46, a resistor R48, a transistor Q43 and resistors R45, R42, R41, both to the output terminal of a monostable multivibrator 2.

Said monostable multivibrator 2 generates switching pulses of a sufficiently small duty ratio for said switching transistors Q47 and Q48, when triggered by clock pulses of a duty ratio of ca. 0.5 and of a predetermined frequency received from a preceding oscillator 1. Junctions a, b between said monostable multivibrator 2 and the transistors Q43, Q44 of the first amplifiers are respectively connected to the collectors of emitter-grounded transistors Q41, Q42 constituting electronic switches for selectively intercepting said switching pulses, thereby selecting the output polarity of the power supply device as will be explained later. The bases of said transistors are connected, in parallel manner, to an interface 44 to an unrepresented microcomputer for controlling the power supply device.

Both ends of a first secondary coil 12 of the transformer T1 are connected to a rectifying-smoothing circuit consisting of a serial connection of a diode D43 and a capacitor C44, of which intermediate junction is connected to an output terminal 3 of the power supply device.

Also both ends of a second secondary coil 13 are connected to a rectifying-smoothing circuit consisting of a serial connection of a diode D44 of a polarity opposite to that of the diode D43 and a grounded capacitor C45, of which intermediate junction is connected to the junction between the first secondary coil 12 and the capacitor C44.

In this manner the voltages respectively generated in the secondary coils 12, 13 are rectified in mutually opposite polarities and smoothed by two rectifying-smoothing circuits, of which outputs are serially combined and connected to the output terminal 3.

In the following there will be explained the function of the above-described embodiment.

In the operation, the intermediate tap TP of the primary coil 11 of the transformer T1 receives a predetermined positive DC voltage Vcc smoothed through a resistor R49 and a cpacitor C43, and the oscillator 1 is activated to release clock pulses of a duty ratio of ca. 0.5 to trigger the monostable multivibrator 2 which thus releases switching pulses of a sufficiently small duty ratio.

According to the polarity of the output voltage to be obtained from the power supply device, one of the input signals from the interface 44 to the bases of the transistors Q41, Q42 is maintained at a low level while the other is maintained at a high level, whereby said switching pulses are supplied to a switching transistor Q47 or Q48.

In case the input signals to the bases of the transistors Q41 and Q42 are respectively high and low, the transistor Q41 is turned on to ground the switching pulses through the junction a and to turn off the transistors Q43, Q46 and Q48, while the transistor Q42 is turned off to introduce the switching pulses through the junction b to the base of the transistor Q44, then amplified by transistors Q44, Q45 and guided to the base of the transistor Q47 thereby turning on and off the same.

On the other hand, in case the input signals to the bases of the transistors Q41 and Q42 are respectively low and high, the transistor Q47 is turned off while the transistor Q48 is turned on and off by the switching pulses.

In case the transistor Q48 is turned off and the transistor Q47 is switched on and off, the circuit functions in the following manner.

When the transistor Q47 is turned on, a current flows in the primary coil 11 from the terminal E of the intermediate tap to an end terminal C, thus generating so-called forward voltage E1 in the secondary coils 12, 13 according to the ratio of number of turns of the coils.

Due to the difference in polarities of the diodes D43 and D44, the diode D43 is turned off while the diode D44 is turned on whereby said forward voltage E1 is not charged in the capacitor C44 but in the capacitor C45.

Then, when the transistor Q41 is turned off, the current in the primary coil 11 is interrupted to generate, in the secondary coils 12, 13, a so-called flyback voltage −E2 of a polarity opposite to that of said forward voltage E1.

Due to the inversion of the polarity of the generated voltage, the diode D43 is now turned on while the diode D44 is turned off whereby said flyback voltage −E2 is charged solely in the capacitor C44.

The forward voltage E1 previously charged in the capacitor C45 and the flyback voltage −E2 charged in the capacitor C44 are smoothed by said capacitors to provide an output voltage HVout from the output terminal 3. The output voltage HVout, which is equal to the sum of the outputs of two rectifying-smoothing circuits, is given by:

$$HV\text{out} = \frac{E1 \times T1 - E2 \times T2}{T1 + T2}$$

wherein T1 is the turn-on period of the transistor Q47 or the period of generation of the forward voltage E1, and T2 is the turn-off period of the transistor Q47 or the period of generation of the flyback voltage E2. Said output voltage HVout assumes a predetermined negative value since the duty ratio of the switching pulses is sufficiently small (T1<<T2) as explained before.

When the transistor Q47 is turned off, there is formed a resonance circuit composed of the resonance capacitor C41 and the inductance L of the primary coil 11 between the intermediate tap TP and the terminal C thereof to generate a voltage resonance, whereby a negative voltage is generated in the inductance L to ensure the above-mentioned turning-off operation and to reduce the switching loss. Also an improved efficiency is achieved in this case since a current flows through the damper diode D41.

On the other hand, in case the transistor Q47 is turned off and the transistor Q48 is switched, a current flows in the primary coil from the terminal E to the terminal F in the inverted direction, so that the forward and flyback voltages generated in the secondary coils 12, 13 by the on-off operation of the transistor Q48 are respectively −E1 and +E2 of inverted polarities. Thus, through operations inverse to the foregoing case, the capacitor C44 is charged with the forward voltage −E1 while the capacitor C45 is charged with the flyback voltage E2. By smoothing function of said capacitors there is obtained, at the output terminal 3, an output voltage HVout:

$$HV\text{out} = \frac{-E1 \times T1 + E2 \times T2}{T1 + T2}$$

which assumes a predetermined positive value because T1<<T2.

Figure 6:
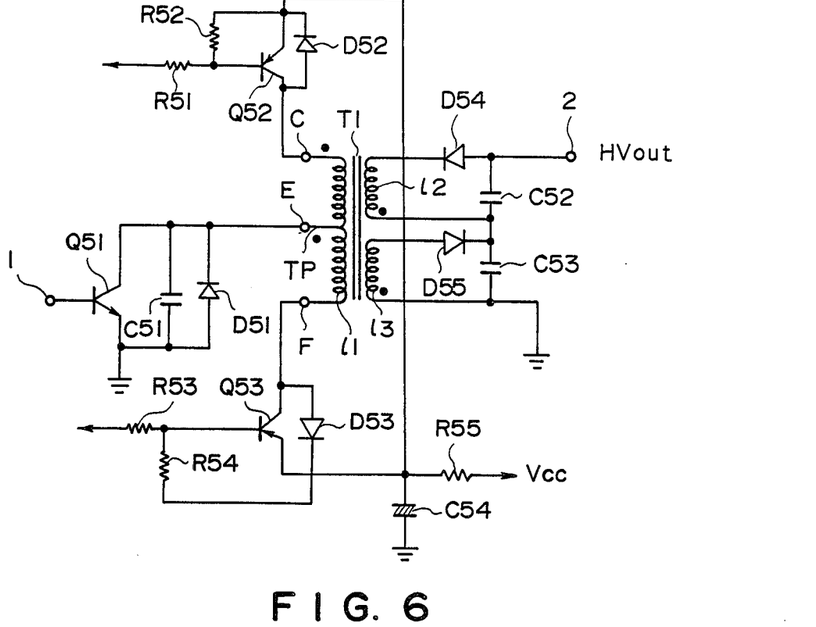
FIGS. 6 and 7 are circuit diagrams of power supply devices for supplying DC voltages from both ends of a primary coil.

FIG. 6 is a circuit diagram of a power supply device constituting still another embodiment of the present invention, wherein the DC voltage Vcc is not supplied from the intermediate tap of the primary coil but from either end thereof.

Both ends C, F of the primary coil 11 are respectively connected to transistors Q52, Q53 and then to an unrepresented power supply circuit, for supplying a predetermined DC voltage Vcc, through a smoothing capacitor C54 and a resistor R55.

The transistors Q52, Q53 constitute an electronic switch for switching the polarity of output of the power supply device by selectively supplying the DC voltage Vcc to either of the terminals C and F of the primary coil 11, and the bases of said transistors receive, respectively through resistors R51, R53, control output signals, for example, of a microcomputer for controlling the power supply device, thereby selectively turning on either transistor. Damper diodes D51, D52 are connected between the collector and emitter of the transistors Q52, Q53.

The terminal E of the intermediate tap TP of the primary coil 11 is connected to the collector of a switching transistor Q51 for exciting the transformer T1 by turning on and off the DC current supplied to said primary coil 11. The base terminal 1 of said transistor Q51 receives switching pulses from an unrepresented pulse generator, while the emitter thereof is grounded, and, between said collector and emitter there are connected a resonance capacitor C51 and damper diode D51 in parallel manner.

Both ends of a first secondary coil 12 of the transformer T1 are connected to a rectifying-smoothing circuit consisting of a serial connection of a diode D54 and capacitor C52, of which the intermediate junction is connected to an output terminal 2 of the power supply device.

Both ends of a second secondary coil 13 are connected to a rectifying-smoothing circuit consisting of a diode D55, inverse in polarity to the diode D54, and a grounded capacitor C53, of which the intermediate junction is connected to the junction between the first secondary coil 12 and the capacitor C52.

In this manner the voltages respectively generated in the secondary coils 12, 13 are rectified in mutually opposite polarities and smoothed by two rectifying-smoothing circuits, whose outputs are serially combined and supplied to the output terminal 3.

In the following there will be explained the function of the above-described embodiment.

In the operation, a predetermined DC voltage Vcc smoothed by the capacitor C54 and the resistor R55 is supplied, through either the transistor Q52 or Q53 constituting an electronic switch, to either the terminal C or F of the primary coil 11 of the transformer T1, and switching pulses are supplied to the base of the switching transistor Q51 to turn on and off the same, thereby switching the DC current supplied to the primary coil 11 and thus exciting the transformer T1.

Said switching pulses have a sufficiently small duty ratio, so that the turned-on period of said transistor Q51 is sufficiently shorter than the turned-off period thereof.

In the following there will be explained the function of the circuit in case the transistors Q53 and Q52 are respectively turned on and off.

When the switching transistor Q51 is turned on, a current flows in the primary coil 11 from an end F to the intermediate tap E to generate so-called forward voltage E1 in the secondary coils 12, 13 according to the ratio of numbers of turns of the coils.

Due to the difference in the polarity of the diodes D54, D55, the former is, for example, turned off while the latter is turned on whereby the forward voltage E1 is not charged in the capacitor C52 but in the capacitor C53.

Then, when the transistor Q51 is turned off, the current in the primary coil 11 is interrupted to generate, in the secondary coils 12, 13, a so-called flyback voltage −E2 which is inverse in polarity to the forward voltage E1.

Due to the inversion of the generated voltage, the diode D54 is turned on while the diode D55 is turned off whereby said flyback voltage −E2 is charged only in the capacitor C52.

The forward voltage E1 previously charged in the capacitor C53 and the flyback voltage −E2 now charged in the capacitor C52 are smoothed by said capacitors to provide the output voltage HVout at the output terminal 2. The output voltage HVout, which is equal to the sum of the outputs of two rectifying-smoothing circuits, is given by:

$$HVout = \frac{E1 \times T1 - E2 \times T2}{T1 + T2}$$

wherein T1 is the turned-on period of the transistor Q51 or the generating period of the forward voltage E1, while T2 is the turned-off period or the generating period of the flyback voltage E2. The output voltage HVout assumes a predetermined negative value since the switching pulses have a sufficiently small duty ratio as mentioned before, so that $T1 << T2$.

When the transistor Q51 is turned off, there is formed a resonance circuit consisting of the resonance capacitor C51 and an inductance L of the primary coil 11 between the terminals E, F thereof to generate a voltage resonance, thereby ensuing the above-explained turning-off operation and reducing the switching loss. Besides, in this case, a higher efficiency is obtained since a current flows through the damper diode D51.

On the other hand, when the transistor Q52 is turned on and the transistor Q53 is turned off, a current flows in the primary coil 11 from the terminal C to the terminal E, namely in a direction opposite to that in the above-explained case, so that the forward and flyback voltages generated in the secondary coils 12, 13 through the on-off operation of the transistor Q51 are −E1 and E2, which are inverse in polarity to the above-explained case. Thus, through operations inverse to those explained before, the capacitor C52 is charged with the forward voltage −E1 while the capacitor C53 is charged with the flyback voltage E2. Through smoothing with said capacitors, there is obtained an output voltage:

$$HVout = \frac{-E1 \times T1 + E2 \times T2}{T1 + T2}$$

which assumes a predetermined positive value because of $T1 << T2$.

In case an inverse high voltage is applied between the collector and emitter of the transistor Q52 or Q53, said transistor is protected by the diode D52 or D53 which is rendered conductive for such inverse voltage.

Figure 7:
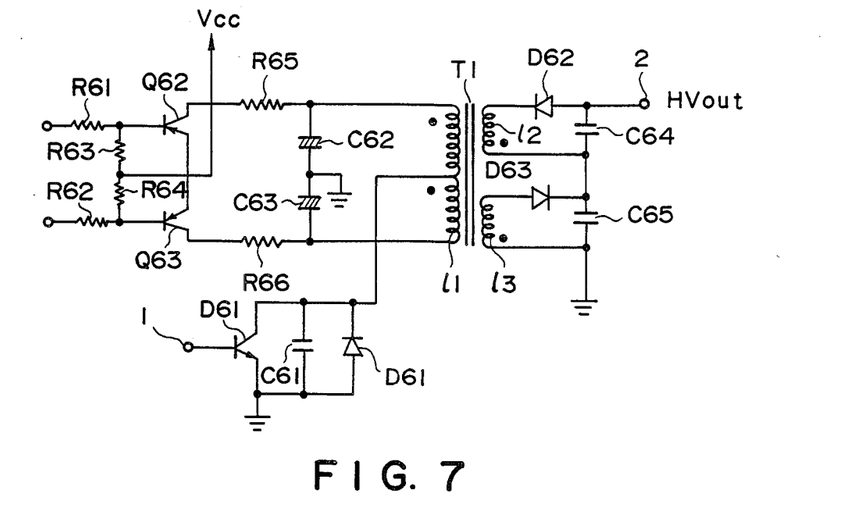

FIG. 7 is a circuit diagram of a power supply device constituting still another embodiment of the present invention. In the present embodiment, a filter circuit, consisting of smoothing capacitors C62, C63 and resistors R65, R66, is connected between transistors Q62, Q63 constituting an electronic switch and the primary coil 11, instead of the smoothing circuit provided, in case of FIG. 6, between the Vcc supply circuit and the transistors Q52, Q53.

In the present embodiment, the DC voltage Vcc supplied to the primary coil 11 is smoothed by the filter circuit, and the capacitors C62, C63 protect the transistors Q62, Q63 to dispense with the damper diodes D52, D53 required in the circuit shown in FIG. 6. In the present embodiment, however, the switching speed of the output voltage by the on-off operation of the transistors Q62, Q63 becomes lower than that in the preceding embodiment, due to the presence of the capacitors C62, C63.

The function and effect of the present embodiment are same as those of the embodiment shown in FIG. 6, in other aspects.

Figure 8:
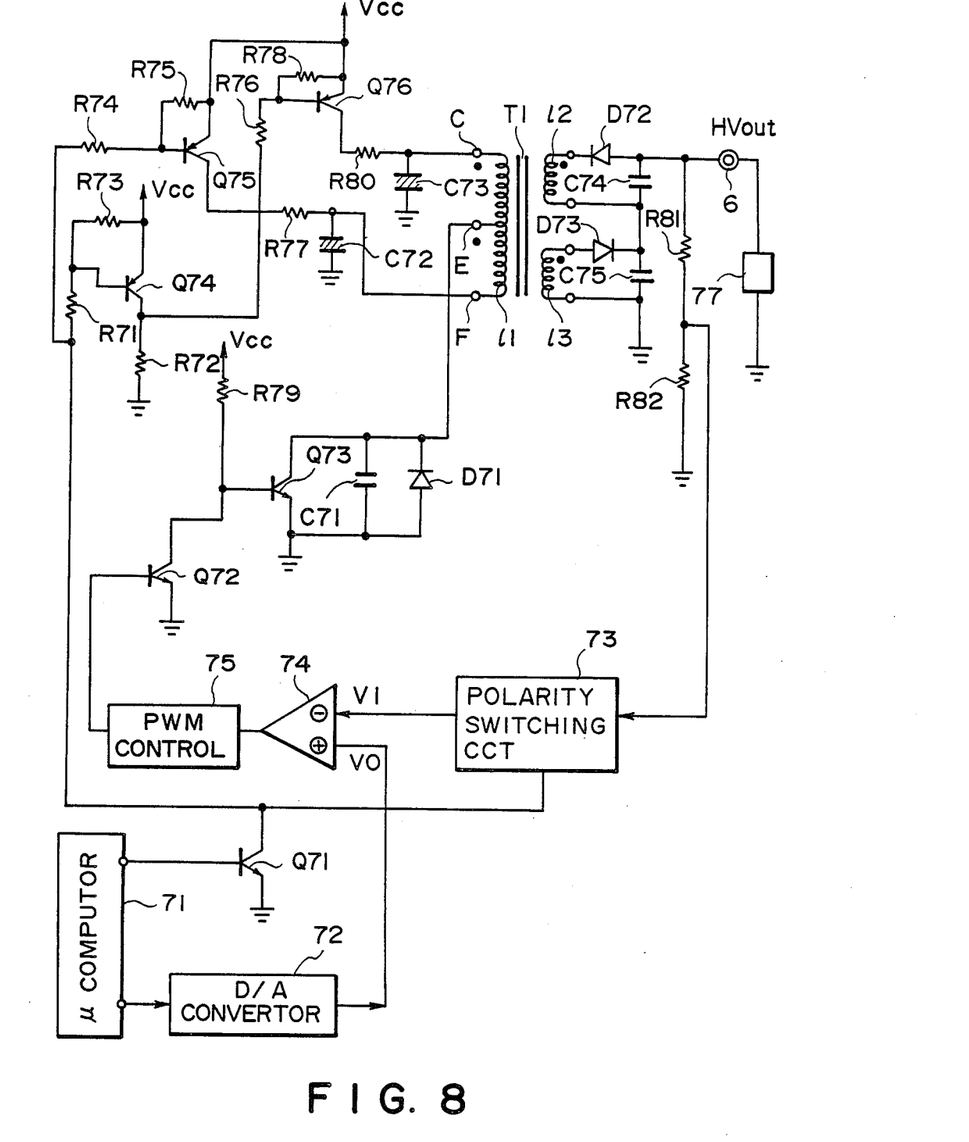
FIGS. 8 and 9 are circuit diagrams of power supply devices in which a secondary output is fed back to a primary side.
Figure 9:
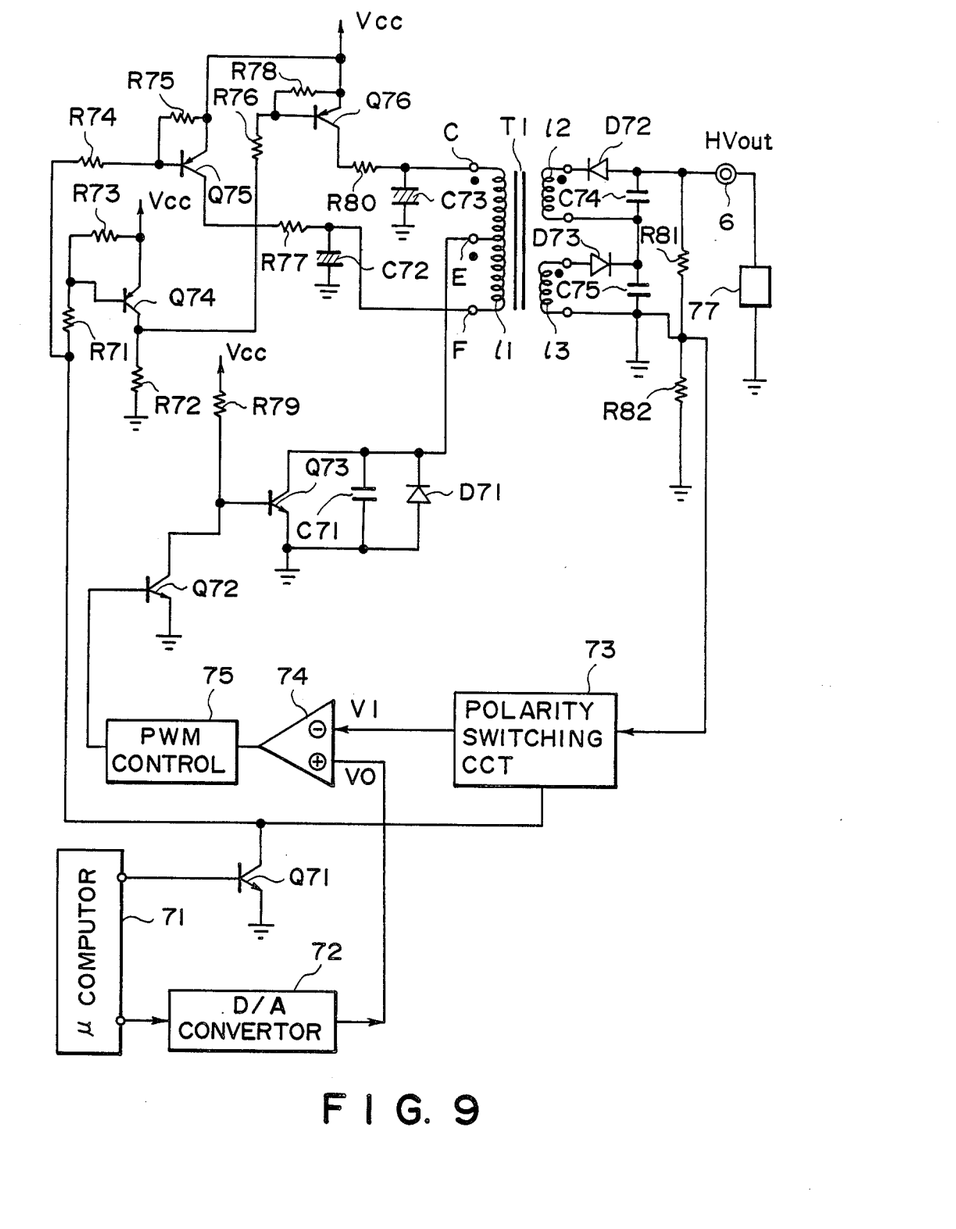

FIGS. 8 and 9 are circuit diagrams of power supply devices constituting still other embodiments of the present invention, wherein the output of the secondary side is fed back to the primary side for achieving a constant voltage or current control.

Both ends F, C of the primary coil 11 are connected to an unrepresented power supply circuit for supplying a predetermined DC voltage Vcc, respectively through smoothing capacitors C72, C73, current-limiting resistors R77, R80 and transistors Q75, Q76.

The transistors Q75, Q76 constitute an electronic switch in combination with transistors Q71 and Q74, to be explained later, for switching the polarity of the output voltage of the power supply device by selectively supplying said DC voltage Vcc to either the terminal F or C of the primary coil 11. The base of the transistor Q75 is connected to the collector of the transistor Q71 through the current-limiting resistor R74, while the base of the transistor Q76 is connected to said collector through an inverter circuit consisting the transistor Q74 and the resistors R71, R72 and R73. The transistor Q71 is grounded at the emitter thereof, and receives, at the base thereof, control output signals of a microcomputer 71 for controlling the power supply device. Thus the microcomputer turns on and off the transistor Q71, which in turn controls the transistors Q75 and Q76 to turn on either one.

The terminal E of the intermediate tap TP of the primary coil 11 is connected to the collector of a switching transistor Q73, which excites the transformer T1 by turning on and off a DC current supplied to the primary coil 11.

The base of said transistor Q73 receives switching pulses which are generated by a pulse width modulation (PWM) control circuit, to be explained later, and inverted and amplified by a transistor Q72. The transistor Q73 is grounded at the emitter thereof, and a resonance capacitor C71 and a damper diode D71 are connected in parallel manner between the collector and emitter.

Both ends of a first secondary coil 12 of the transformer T1 are connected to a rectifying-smoothing circuit consisting of a serial connection of a diode D72 and a capacitor C74, of which intermediate junction is connected to an output terminal 6 of the power supply device, connected to a load 77.

Both ends of a second secondary coil 13 are connected to a rectifying-smoothing circuit consisting of a serial connection of a diode D73, inverse in polarity to said diode D72, and a grounded capacitor C75, of which intermediate junction is connected to the junction between the first secondary coil 12 and the capacitor C74.

Thus the voltages respectively generated in the secondary coils 12, 13 are rectified in mutually opposite polarities and smoothed by two rectifying-smoothing circuits, of which outputs are combined serially and supplied to the output terminal 6.

For detecting a divided voltage of the output voltage HVout at the terminal 6, there is connected thereto a voltage divider consisting of a serial connection of a resistor R81 and a grounded resistor R82, of which intermediate junction is connected, through a polarity selector 73 for inverting the polarity of the divided voltage at said junction, to the inverted input terminal of a differential amplifier 74.

Said polarity selector 73 either transmits said divided voltage to the operational amplifier 74 or inverts the polarity of said divided voltage, according to the level of the control input signal generated by the on-off operation of the transistor Q71. In the following explanation it is assumed that the divided voltage is inverted or not respectively when the transistor Q71 is turned off or on.

The differential amplifier 74 determines the difference between said divided voltage supplied to the inverted input terminal and a reference voltage supplied to the non-inverted input terminal, and releases said difference after amplification. Said reference voltage is supplied as a digital value by the microcomputer 71 in relation to the absolute value of the target output voltage to be obtained from the power supply device and given to said differential amplifier 74 after conversion into analog form by a D/A converter 72. Said reference voltage is given as a positive absolute value, regardless of the polarity of the target output voltage. The output terminal of the differential amplifier 74 is connected to the input terminal of the PWM control circuit 75.

Said PWM control circuit 75 is already known and is capable of releasing pulses of a variable duty ratio by comparing the input voltage with a triangular or sawtooth wave of a predetermined frequency, and said pulses are inverted and amplified in the transistor Q72 as explained before and supplied as the switching pulses to the base of the transistor Q73.

In the following there will be explained the function of the above-described embodiment.

In the operation, a predetermined positive DC voltage Vcc is supplied from said power supply circuit to the emitters of the transistors Q75, Q76 constituting the electronic switch, and the control signals from the microcomputer 71 turns on and off the transistor Q71 according to the polarity of the output voltage to be obtained from the power supply device, thereby supplying said DC voltage Vcc to either the terminal C or F of the primary coil 11. Said DC voltage Vcc is smoothed by the capacitor C72 or C73.

Simultaneously the switching pulses are supplied to the base of the switching transistor Q73 to turn on and off the same, thereby turning on and off the DC current supplied in the primary coil 11 and thus exciting the transformer T1.

Said switching pulses, supplied from the PWM control circuit 75 to the base of the transistor Q73 after inversion in the transistor Q72, have a sufficiently small duty ratio and are controlled, as will be explained later, according to the absolute value of the output voltage to be obtained from the power supply device.

In the following there will be explained the operation of the circuit when the transistor Q71 is turned off by the control signal from the microcomputer 71.

When the transistor Q71 is turned off, the transistors Q75, Q74 are turned off while the transistor Q76 is turned on to supply the DC voltage Vcc to an end terminal C of the primary coil 11.

When the switching transistor Q73 is turned on in this state, a current flows in the primary coil 11 from the end terminal C to the terminal E of the intermediate tap, thus generating a so-called forward voltage E1 in the secondary coils 12, 13 according to the ratio of the number of turns of the coils.

Because of the difference in polarity of the diodes D72, D73, the former is, for example, turned off while the latter is turned on whereby said forward voltage is not charged in the capacitor C74 but in the capacitor C75.

Then, when the transistor Q73 is turned off, the current in the primary coil 11 is interrupted to generate, in the secondary coils 12, 13, so-called flyback voltage −E2 which is inverse in polarity to said forward voltage.

In this state, because of the inversion of the generated voltage in polarity, the diode D72 is now turned on while the diode D73 is turned off whereby the flyback voltage −E2 is charged only in the capacitor C74.

Thus, the forward voltage E1 previously charged in the capacitor C75 and the flyback voltage $-E2$ charged in the capacitor C74 are smoothed by said capacitors to provide an output voltage HVout at the output terminal 6. Said output voltage HVout, which is equal to the sum of the outputs of two rectifying-smoothing circuits, is given by:

$$HVout = \frac{E1 \times T1 - E2 \times T2}{T1 + T2}$$

wherein T1 is the turned-on period of the transistor Q73 or the generating period of the forward voltage E1, and T2 is the turned-off period of the transistor Q73 or the generating period of the flyback voltage. Said output voltage HVout assumes a predetermined negative value since the switching pulses have a sufficiently small duty ratio, so that $T1 << T2$.

When the transistor Q73 is turned off, there is formed a resonance circuit consisting of the resonance capacitor C71 and an inductance L of the primary coil 11 between the terminals C, F thereof to generate a voltage resonance, thereby generating a negative voltage in the inductance L to ensure the above-mentioned turning-off operation and to reduce the switching loss. Besides, a higher efficiency is achieved in this case since the current flows through the damper diode D71.

On the other hand, in order to control the absolute value of said output voltage HVout with a high precision, said output voltage is divided by the resistors R81, R82 and the obtained divided voltage $-V1$ is supplied to the polarity selector 73.

Since the transistor Q71 is turned off in this state, the polarity selector 73 inverts the polarity of said divided voltage $-V1$ as explained before, and the inverted voltage $+V1$ is supplied to the inverted input terminal of the differential amplifier 74.

The differential amplifier 74 determines, a difference voltage V1–V0 wherein V0 is a reference voltage corresponding to the target output voltage, and supplies the difference voltage to the PWM control circuit 75 after amplification.

The PWM control circuit 75 regulates the duty ratio of the pulses to be supplied to the transistor Q72, according to the polarity and magnitude of the difference voltage V0–V1.

For example, in case the difference voltage V0–V1 is positive, indicating that the absolute value of the actual output voltage HVout corresponding to said divided voltage V1 is smaller than the absolute value of the target output voltage corresponding to the reference voltage V0, the duty ratio of the output pulses is made larger. Thus, the duty ratio of the switching pulses obtained by inversion in the transistor Q72 is made smaller, whereby the turned-on period T1 of the transistor Q73 becomes shorter in reference to the turned-off period T2 to shift the output voltage HVout toward the target output voltage.

On the other hand, in case the difference voltage V0–V1 is negative, an inverse procedure is conducted to control the output voltage HVout toward the target output voltage.

In the following the operation when the transistor Q71 is turned on by the control signal from the microcomputer 71 is explained.

In response to the turning on of the transistor Q71 the transistors Q75 and Q74 are turned on while the transistor Q76 is turned off to cause a current in the primary coil 11 from the terminal F to E. This current is inverse in direction to the above-explained case, whereby the forward and flyback voltages generated in the secondary coils 12, 13 by the on-off operation of the transistor Q73 become $-E1$ and $+E2$, which are inverse in polarity to those in the above-explained case. Thus, through operations inverse to those in the preceding explanation, the capacitor C74 is charged with the forward voltage $-E1$ while the capacitor C75 is charged with the flyback voltage E2. Through smoothing function with said capacitors, there is obtained at the output terminal, an output voltage:

$$HVout = \frac{-E1 \times T1 + E2 \times T2}{T1 + T2}$$

which assumes a predetermined positive value, because $T1 << T2$.

As already explained before, a divided voltage 83 is obtained by dividing the output voltage HVout with the resistors R81, R82 and is supplied to the differential amplifier 74 without the polarity inversion in the polarity selector 73, since the transistor Q71 is turned off in this state.

Then, in the manner as explained before, the PWM control circuit 75 regulates the duty ratio of the output pulses according to the output voltage of the differential amplifier 74, thus controlling the output voltage HVout toward the target output voltage.

As explained in the foregoing, the present embodiment, employing a structure in which positive and negative power supply circuits are combined, permits obtaining positive and negative output voltages by switching the direction of current supplied to the primary coil 11 through the transistors Q71, Q74, Q75 and Q76 constituting an electronic switch.

Also it is capable of regulating the output voltage to a desired value, through a control circuit composed of the microcomputer 71, D/A converter 72, polarity selector 73, differential amplifier 75 and pulse width modulation control circuit 75.

The embodiment shown in FIG. 8 effects a constant voltage control over the output voltage HVout. It is also possible to effect a constant current control over the output current, by connecting the junction between the secondary coil 13 and the capacitor C75, grounded in the embodiment shown in FIG. 8, to the junction between the resistors R81 and R82 as shown in FIG. 9 which illustrates still another embodiment of the present invention.

In this case the output current flowing in the load 77 and the resistor R82 is detected as a voltage across the resistor R82, and said voltage is supplied to the polarity selector 73 to effect a control as explained before, thereby achieving a constant current control of the output current.

As explained in the foregoing, the unified structure of positive and negative power supply circuits allows to reduce the number of component parts, to provide a more compact device and to reduce the manufacturing cost. Also noise generation is prevented since the switching of polarity of the output voltage is conducted by switching in the input side of a lower (absolute) voltage.

What we claim is:

1. A power supply device comprising:
   a transformer provided with a primary coil and first and second secondary coils;

switching means for turning on and off a DC current supplied to said primary coil;

first and second rectify-smoothing means for rectifying and smoothing, in mutually opposite polarities, voltages generated in said first and second secondary coils by the turning on and off operation of said switching means;

output means for outputting the sum of outputs of said first and second rectify-smoothing means to a load; and selection means for selecting a polarity of an output voltage from said output means, said selection means being connected to a primary side of said transformer.

2. A power supply device according to claim 1, wherein said switching means comprises a switching transistor, a resonance capacitor and a damper diode which are connected in parallel to said switching transistor.

3. A power supply device according to claim 1, wherein each of said first and second secondary coils comprises plural coils serially connected through rectifying elements.

4. A power supply device according to claim 1, wherein said rectify-smoothing means comprises rectify-smoothing circuits of two stages.

5. A power supply device according to claim 1, wherein the turn-on period of said DC current obtained by said switching means is sufficiently shorter than the turn-off period of said DC current.

6. A power supply device according to claim 1, wherein said selection means is operable to switch over the polarity of the output voltage of said output means by means of switching a direction of the current supplied to said primary coil.

* * * * *

UNITED STATES PATENT AND TRADEMARK OFFICE
CERTIFICATE OF CORRECTION

PATENT NO. : 4,739,461
DATED : April 19, 1988
INVENTOR(S) : S. KOMATSU, ET AL.

It is certified that error appears in the above-identified patent and that said Letters Patent is hereby corrected as shown below:

IN THE REFERENCES CITED - OTHER PUBLICATIONS AT [56]

"pp. 43, 4," SHOULD READ --PP. 43-4,--.

IN THE DRAWINGS

Sheet 5, Fig. 8, "µ COMPUTOR" should read
--µ COMPUTER--.
Sheet 5, Fig. 8, "D/A CONVERTOR" should read
--D/A CONVERTER--.
Sheet 6, Fig. 9, "µ COMPUTOR" should read
--µ COMPUTER--.
Sheet 6, Fig. 9, "D/A CONVERTOR" should read
--D/A CONVERTER--.

COLUMN 1

Line 12, insert --2. Description of the Prior Art--.

COLUMN 2

Line 15, "SW1, for" should read
--SW1 operated, for--.
Line 65, "so-called" should read --a so-called--.

UNITED STATES PATENT AND TRADEMARK OFFICE
CERTIFICATE OF CORRECTION

PATENT NO. : 4,739,461

DATED : April 19, 1988

INVENTOR(S) : S. KOMATSU, ET AL.

It is certified that error appears in the above-identified patent and that said Letters Patent is hereby corrected as shown below:

COLUMN 3

Line 16, "charge" should read --charged--.
Line 52, "allows to obtain" should read --permits obtaining--.

COLUMN 4

Line 66, "so-called" should read --a so-called--.

COLUMN 5

Line 8, "so-called" should read --a so-called--.
Line 30, "11 from" should read --11 flows from--.
Line 66, "a same" should read --the same--.
Line 68, "same" should read --the same--.

COLUMN 7

Line 13, "cpacitor C43," should read --capacitor C43,--.
Line 44, "so-" should read --a so- --.

UNITED STATES PATENT AND TRADEMARK OFFICE
CERTIFICATE OF CORRECTION

PATENT NO. : 4,739,461

DATED : April 19, 1988

INVENTOR(S) : S. KOMATSU, ET AL.

It is certified that error appears in the above-identified patent and that said Letters Patent is hereby corrected as shown below:

COLUMN 9

Line 39, "so-called" should read --a so-called--.

COLUMN 10

Line 10, "ensuing" should read --ensuring--.
    Line 59, "same" should read --the same--.

COLUMN 12

Line 62, "so-called" should read --a so-called--.

COLUMN 13

Line 37, "determines," should read --determines--.

Signed and Sealed this

Twenty-second Day of November, 1988

Attest:

DONALD J. QUIGG

*Attesting Officer*  *Commissioner of Patents and Trademarks*